United States Patent [19]
Schmidt

[11] Patent Number: 6,072,294
[45] Date of Patent: Jun. 6, 2000

[54] METHOD AND SYSTEM FOR MEASURING OUTPUT TORQUE OF A MOTOR

[75] Inventor: Klemens Schmidt, Wurzburg, Germany

[73] Assignee: SKF GmbH, Germany

[21] Appl. No.: 08/851,624

[22] Filed: May 6, 1997

[30] Foreign Application Priority Data

May 24, 1996 [DE] Germany .................. 196 21 046

[51] Int. Cl.[7] .................................................. H02K 17/32
[52] U.S. Cl. ........................ 318/434; 318/430; 318/490
[58] Field of Search ................... 318/430–490, 318/810, 599, 286, 800–832; 324/160–180

[56] References Cited

U.S. PATENT DOCUMENTS

| | | | |
|---|---|---|---|
| Re. 32,579 | 1/1988 | Harvey et al. ........................ | 318/434 |
| 3,593,083 | 7/1971 | Blaschke ............................... | 318/227 |
| 3,648,138 | 3/1972 | Kalis ..................................... | 318/231 |
| 3,887,855 | 6/1975 | Klimo ................................... | 318/434 |
| 4,491,775 | 1/1985 | Harvey et al. ........................ | 318/434 |
| 4,659,976 | 4/1987 | Johanson .............................. | 318/332 |
| 4,763,058 | 8/1988 | Heining et al. ...................... | 318/807 |
| 4,833,388 | 5/1989 | Dorner ................................. | 318/800 |
| 4,908,624 | 12/1990 | Bernhardt ............................ | 318/434 |
| 5,509,879 | 10/1991 | Watanabe ............................ | 318/603 |

*Primary Examiner*—Paul Ip
*Attorney, Agent, or Firm*—Eugene E. Renz, Jr. PC

[57] ABSTRACT

Method for measuring the output torque of an asynchronous motor having a stator and a rotor comprising the steps of measuring the rotational frequency of the stator field of the motor, the rotational speed of the rotor, calculating a measurement value for the slip speed from the difference between the rotational speed of the rotor and rotational frequency of the stator field, and calculating a measurement value for the output torque form the slip speed and statistical performance characteristic values for the output torque intrinsic to the motor.

6 Claims, 1 Drawing Sheet

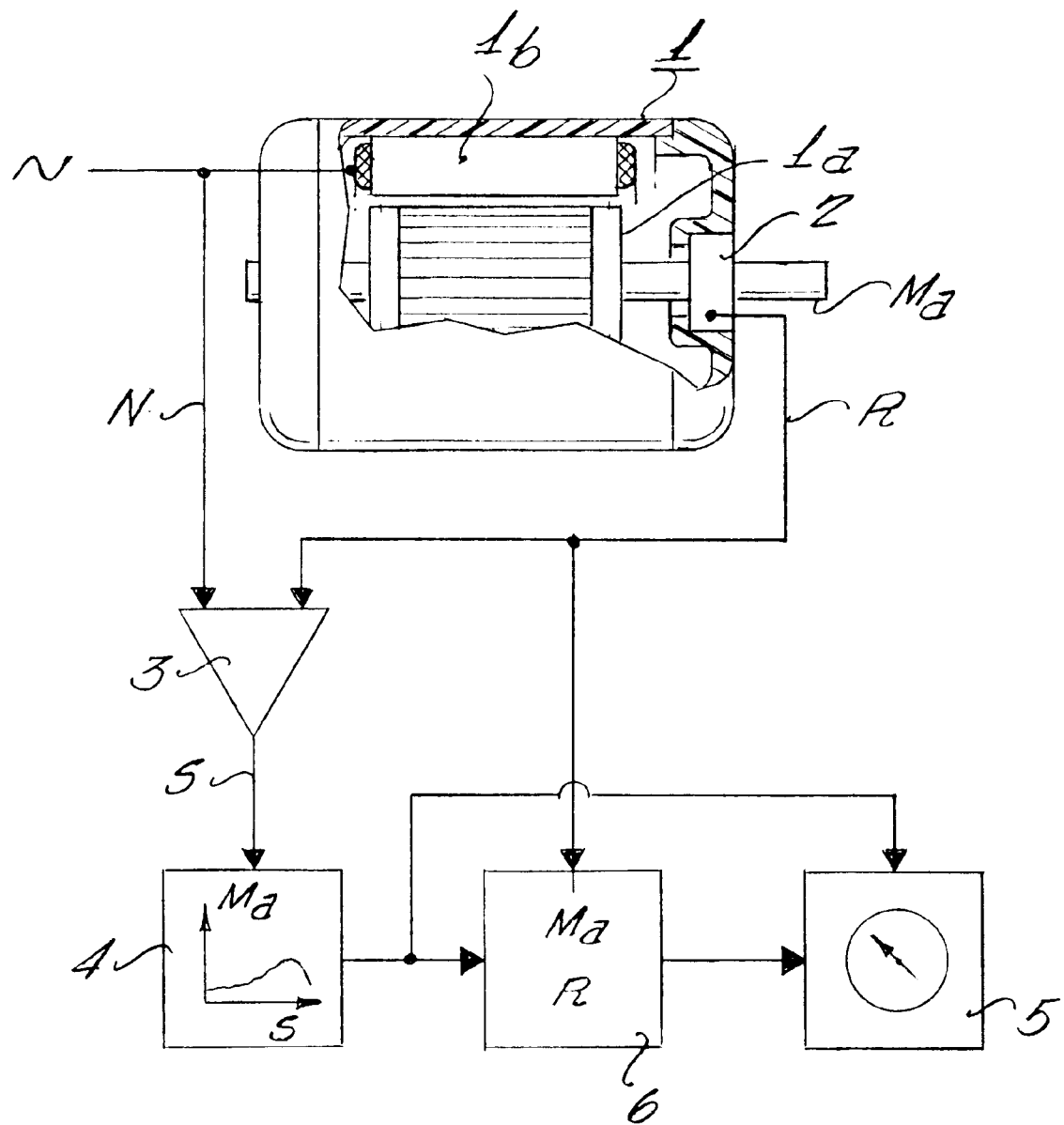

METHOD AND SYSTEM FOR MEASURING OUTPUT TORQUE OF A MOTOR

FIELD OF THE INVENTION

The present invention relates to method and system for measuring the output torque of motors and particularly asynchronous motors.

BACKGROUND OF THE INVENTION

In motor driven assemblies, transmissions or systems, there are a number of variables for detecting defects. Torque is a key variable for detecting defects, failures and calculation of service life. It is know that precise torque measurements can be made by use of strain gauges of various conventional types to measure the elastic twisting or bending of bushings, shafts, flexible beams and the like. In these systems, however, it has been found that it is always necessary to modify the output or drive mechanism of the system. Further, these methods have been found to be quite expensive because of the need for sensitive amplifiers. Additionally, they are subject to error because of the many environmental parameters which effect accuracy.

Also, force-measuring bearings are used in applications where the load is in a radial or axial direction. These bearings are also provided with strain gauges and require similar sensitive components to process the measurement values. Asynchronous electric motors are widely used for power take-off, because they are cheap, compact and in most in most instances can be connected directly to the power grid.

SUMMARY OF THE INVENTION

With the foregoing in mind therefore, it is an object of the present invention to provide a method and system for measuring output torque, particularly in asynchronous motors which employs simple means to supply a reliable measurement value for the output torque and wherein the system is affected in a lesser degree by environmental influences.

To this end, in accordance with the present invention, the method consist of measuring the rotational frequency of the stator field of the motor and the rotational speed of the rotor, calculating a measurement value for the slip speed, which is the difference between the rotational speed of the rotor and the rotational frequency of the stator field and calculating a measurement value for the output torque from the slip speed and statistical characteristic values for the output torque intrinsic to the motor. The apparatus or device for practicing the method of the present invention includes an adapter for measuring the rotational frequency of the stator field and a sensor for measuring the rotational speed of the rotor. The system further includes a differential circuit for calculating the slip speed and a read-only memory for the motor's intrinsic characteristic curve of the drive torque as a function of the slip speed with an input for the slip speed and an output for the output torque. The system also includes a display device for the output torque with outputs for the further processing of the measurement signal.

In accordance with the present invention, the operations described can be completely digitized and thus rendered substantially invulnerable to environmental influences such as temperature, humidity, vibration, intrinsic heating and fluctuations in the supply voltage. Accordingly, many of the interferences which occur under harsh plant operating conditions are eliminated. Furthermore, the system offers a high level of safety, making it possible for many motors to be used in hazardous areas.

The features, according to the present invention, are based on the use of an asynchronous motor as the drive for many different kinds of load systems. The method of the present invention involves the processing of measurement values and the system comprises a compact circuit component with input for the measurement values and outputs for signal and control voltages for display or further processing.

This invention provides a measurement of motor output torque with a simple, reliable device and method which minimizes environmental effects and contains the following features:

a) measurements of the rotational frequency of the stator field;

b) measurements of the rotational speed of the rotor;

c) slip speed calculated from the difference between the rotational speed of the rotor and the rotational frequency of the stator field; and f) output torque is calculated from the slip speed and statistical characteristic values for the output torque intrinsic to the motor.

The system of the present invention utilizes the following elements:

a) a means for measuring the rotational frequency of the stator field;

b) a sensor means for measuring the rotational speed of the rotor;

c) a circuit means for calculating slip speed (the difference between the stator rotational frequency and the rotor rotational speed);

d) a memory means for storing the motor's speed-torque characteristics;

e) a calculating means for determining output torque as a function of slip speed; and f) a display means for viewing the output torque and other performance parameters.

BRIEF DESCRIPTION OF THE DRAWINGS

With the foregoing in mind, these and other objects of the present invention and the various features and details of the operations and construction thereof, are hereinafter more fully set forth with reference to the accompanying drawing, which schematically shows a system and method for measuring output torque.

DETAILED DESCRIPTION OF THE PREFERRED EMBODIMENT

The drawing illustrates a functional block diagram of a system for measuring the output torque of an asynchronous motor (1). Motor (1) has a rotor (1a) and stator (1b) and is provided with a roller bearing (2) which has in a known manner an electrical output supplying a sequence of pulses proportional to the rotational speed (R) of the rotor (1a). Another measurement value (N) is formed by a sequence of pulses corresponding to the frequency of the stator (1d) of the asynchronous motor (1) or the power supply frequency.

The system includes means such as a frequency meter for measuring the rotational frequency (N) of the stator field. Measurement value (N) is formed by a sequence of pulses corresponding to the stator input voltage frequency or to the power supply frequency. In a difference stage (3), a difference pulse sequence is formed from the two measurement values (R, N). This sequence is proportional to the slip speed (S) of asynchronous motor (1). Slip speed (S) increases with the output torque (Ma) but is not strictly proportional to it but depends on the speed vs. torque performance characteristics of the motor. A computer (4) is provided which stores the characteristic curve output torque (Ma)/slip speed (S) corresponding to the specific motor. For every slip speed (S), a signal representing the corresponding value for the output torque (Ma) is generated. The load which can be sustained by the output torque (Ma) as a function of rotor speed (R) is calculated by a circuit identified by the number six (6). It is presented for viewing on a standard commercial display (5) or can be subjected to further processing elsewhere, possibly for monitoring other performance characteristics such as threshold values.

Another use is derived in conjunction with a counter (4), which keeps track of the totality of an effective output torque (Ma) by adding up, for example, all of the rotations of the rotor and balances that off against the value of the output torque (Ma) at the time in question. The amount of service life which has been used up can be subtracted from the statistically derived service life to indicate how much life there is left in bearings, for example, or other power train components.

Even though a particular embodiment of the invention has been illustrated and described herein, it is not intended to limit the invention and changes and modifications may be made therein within the scope of the following claims.

What is claimed is:

1. A method for measuring the output torque of an electric motor having a stator and a rotor comprising the steps of:

measuring the rotational frequency of the stator field of the motor;

measuring the rotational speed of the rotor;

determining a measurement value for the slip speed from the difference between the rotational speed of the rotor and the rotational frequency of the stator field;

calculating a measurement value for the output torque from the slip speed and statistical performance characteristic values for the output torque intrinsic to the motor; and calculating a measurement value for the load from the rotational speed of the rotor and the output torque.

2. A system for measuring the output torque of a motor having a stator and a rotor comprising:

a) means for measuring the rotational frequency (N) of the stator field;

b) sensor means (2) for measuring the rotational speed (R) of the rotor;

c) circuit means (3) for calculating the slip speed (S);

d) memory means (4) for storing the speed-torque statistical performance characteristic of the motor;

e) display means (5) for viewing the output torque (Ma) and other performance parameter; and f) a circuit means (6) for calculating a measurement value for the load of a unit driven by the asynchronous motor (1) from the output torque (Ma) and the output rotor speed R).

3. A method for measuring the output torque of a motor having a stator and a rotor comprising the steps of:

measuring the rotational frequency of the stator field of the motor;

measuring the rotational speed of the rotor;

determining a measurement value for he slip speed from the difference between the rotational speed of the rotor and the rotational frequency of the stator field;

calculating a measurement value for the output torque from the slip speed and statistical performance characteristic values for the output torque intrinsic to the motor; and calculating a measurement value for the load from the rotational speed of the rotor and the output torque, wherein one of the motor bearings (2) is a sensor bearing for measuring the rotational speed (R) of the rotor.

4. A method for measuring the output torque of an electric motor having a stator and a rotor comprising the steps of:

measuring the rotational frequency of the stator field of the motor;

measuring the rotational speed of the rotor;

determining a measurement value for the slip speed from the difference between the rotational speed of the rotor and the rotational frequency of the stator field;

calculating a measurement value for the output torque from the slip speed and statistical performance characteristic values for the output torque intrinsic to the motor;

calculating a measurement value for the load from the rotational speed of the rotor and the output torque; and digitizing said above recited steps.

5. A system for measuring the output torque of a motor having a stator and a rotor comprising:

a) means for measuring the rotational frequency (N) of the stator field;

b) sensor means (2) for measuring the rotational speed (R) of the rotor;

c) circuit means (3) for calculating the slip speed (S);

d) memory means (4) for storing the speed-torque statistical performance characteristic of the motor;

e) display means (5) for viewing the output torque (Ma) and other performance parameter;

f) a circuit means (6) for calculating a measurement value for the load of a unit driven by the asynchronous motor (1) from the output torque (Ma) and the output rotor speed (R); and g) means for digitizing elements (a)–(f) inclusively.

6. A method for measuring the output torque of a motor having a stator and a rotor comprising the steps of:

measuring the rotational frequency of the stator field of the motor;

measuring the rotational speed of the rotor;

determining a measurement value for he slip speed from the difference between the rotational speed of the rotor and the rotational frequency of the stator field;

calculating a measurement value for the output torque from the slip speed and statistical performance characteristic values for the output torque intrinsic to the motor;

calculating a measurement value for the load from the rotational speed of the rotor and the output torque, wherein one of the motor bearings (2) is a sensor bearing for measuring the rotational speed (R) of the rotor; and digitizing said above recited steps.

* * * * *